United States Patent
Song et al.

(10) Patent No.: US 11,087,783 B1
(45) Date of Patent: Aug. 10, 2021

(54) MAGNETIC RECORDING HEAD SOFT ERROR RATE IMPROVEMENT WITH COMPACT MAIN POLE

(71) Applicant: Western Digital Technologies, Inc., San Jose, CA (US)

(72) Inventors: Suping Song, Fremont, CA (US); Terence Lam, Cupertino, CA (US); Changqing Shi, San Ramon, CA (US); Lijie Guan, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/917,521

(22) Filed: Jun. 30, 2020

(51) Int. Cl.
*G11B 5/31* (2006.01)
*G11B 5/00* (2006.01)

(52) U.S. Cl.
CPC .... *G11B 5/3116* (2013.01); *G11B 2005/0018* (2013.01)

(58) Field of Classification Search
None
See application file for complete search history.

(56) References Cited

U.S. PATENT DOCUMENTS

| | | | |
|---|---|---|---|
| 7,133,253 B1 | 11/2006 | Seagle et al. | |
| 8,018,676 B2 | 9/2011 | Guan | |
| 8,116,033 B2 | 2/2012 | Kameda et al. | |
| 8,233,233 B1 | 7/2012 | Shen et al. | |
| 8,320,078 B1 | 11/2012 | Zeltser et al. | |
| 8,345,384 B1* | 1/2013 | Sasaki ............ | G11B 5/1278 360/125.15 |
| 8,416,528 B1* | 4/2013 | Sasaki ............ | G11B 5/3146 360/125.02 |
| 8,472,137 B2* | 6/2013 | Hirata ............ | G11B 5/3163 360/125.11 |
| 8,477,452 B2* | 7/2013 | Sasaki ............ | G11B 5/3116 360/125.13 |

(Continued)

OTHER PUBLICATIONS

Bai et al. "Writer pole tip remanence in perpendicular recording," IEEE Transactions on Magnetics, vol. 42, No. 3, Mar. 2006, pp. 473-480, doi: 10.1109/TMAG.2005.862758.

(Continued)

*Primary Examiner* — William J Klimowicz
(74) *Attorney, Agent, or Firm* — Patterson & Sheridan, LLP; Steven H. Versteeg (57) ABSTRACT

The present disclosure is generally related to a magnetic media drive employing a magnetic recording head. The magnetic recording head comprises a main pole extending to a media facing surface (MFS). The main pole has a gradually increasing cross-section area with a low aspect ratio from the MFS to a surface recessed from and parallel to the MFS. The main pole comprises a first leading edge taper angle (LETA), a second LETA less than the first LETA, a first trailing edge taper angle (TETA), and a second TETA less than the first TETA. The main pole further comprises a first flare recessed a first distance from the MFS, the first flare having a first angle, and a second flare recessed a second distance from the MFS greater than the first distance, the second flare having a second angle greater than the first angle.

23 Claims, 5 Drawing Sheets

(56) References Cited

U.S. PATENT DOCUMENTS

| | | | | |
|---|---|---|---|---|
| 8,520,336 | B1* | 8/2013 | Liu | G11B 5/3116 |
| | | | | 360/125.1 |
| 8,625,235 | B2* | 1/2014 | Takano | G11B 5/314 |
| | | | | 360/125.15 |
| 8,699,183 | B2 | 4/2014 | Sahoo et al. | |
| 9,047,889 | B1* | 6/2015 | Kudo | G11B 5/39 |
| 9,111,564 | B1 | 8/2015 | Liu et al. | |
| 10,643,644 | B1 | 5/2020 | Xue et al. | |
| 2010/0157484 | A1 | 6/2010 | Etoh et al. | |
| 2015/0103439 | A1* | 4/2015 | Yin | G11B 5/1871 |
| | | | | 360/122 |

OTHER PUBLICATIONS

Greaves et al. "Shingled Recording for 2-3 Tbit/in2," IEEE Transactions on Magnetics, vol. 45, No. 10, Oct. 2009, pp. 3823-3829, doi: 10.1109/TMAG.2009.2021663.

Greaves et al. "Thermally Assisted Magnetic Recording at 4 Tbit/in2," IEEE Transactions on Magnetics, vol. 49, No. 6, Jun. 2013, pp. 2665-2670, doi: 10.1109/TMAG.2013.2247388.

Kanai et al. "Finite-Element and Micromagnetic Modeling of Write Heads for Shingled Recording," IEEE Transactions on Magnetics, vol. 46, No. 3, Mar. 2010, pp. 715-721, doi: 10.1109/TMAG.2009.2038354.

\* cited by examiner

MAGNETIC RECORDING HEAD SOFT ERROR RATE IMPROVEMENT WITH COMPACT MAIN POLE

BACKGROUND OF THE DISCLOSURE

Field of the Disclosure

Embodiments of the present disclosure generally relate to data storage devices, and more specifically, to a magnetic media drive employing a magnetic recording head.

Description of the Related Art

Over the past few years, energy assisted magnetic recording (EAMR) has been studied as a recording method to improve the areal density of a magnetic read/write device, such as a hard disk drive (HDD). A current-assisted magnetic recording write head has an electrically conductive stack or an EAMR stack in the write gap. Electrical current flows from the main pole, through the conductive stack, to the trailing shield. The current generates an Ampere field in the main pole, which provides additional torque that changes the precession and assists magnetization switching of the main pole. As a result, both transition field gradient and field rise time are improved, leading to better areal density capability (ADC).

When a bias current is applied from the trailing shield through the EAMR stack to the main pole, or vice versa, the ampere field provides an improved write field gradient and write field rise time to the recording medium. However, the flare shape of the main pole can affect both the write field rise time and the Ampere field distribution when the bias current is applied. For example, many conventional main poles have a cross-section area with a large aspect ratio, resulting in longer distances of domain motion and the Ampere field being non-uniformly distributed in azimuthal direction, which can cause a soft error rate (SER) in the written data to increase, negatively affecting the overall write performance of the magnetic recording head.

Therefore, there is a need in the art for a magnetic recording head having an improved main pole design.

SUMMARY OF THE DISCLOSURE

The present disclosure is generally related to a magnetic media drive employing a magnetic recording head. The magnetic recording head comprises a main pole extending to a media facing surface (MFS). The main pole has a gradually increasing cross-section area with a low aspect ratio from the MFS to a surface recessed from and parallel to the MFS. The main pole comprises a first leading edge taper angle (LETA), a second LETA less than the first LETA, a first trailing edge taper angle (TETA), and a second TETA less than the first TETA. The main pole further comprises a first flare recessed a first distance from the MFS, the first flare having a first angle, and a second flare recessed a second distance from the MFS greater than the first distance, the second flare having a second angle greater than the first angle.

In one embodiment, a magnetic recording head comprises a return pole, a main pole disposed adjacent to the return pole, the main pole extending to a media facing surface, and a coil disposed around a portion of the main pole, the coil being recessed from the media facing surface. The main pole has a first leading edge taper angle. The first leading edge taper angle is an angle a first surface of the main pole is disposed at with respect to a first plane perpendicular to the media facing surface. The first surface is disposed adjacent to the media facing surface. The main pole has a first trailing edge taper angle. The first trailing edge taper angle is an angle a second surface of the main pole is disposed at with respect to a second plane perpendicular to the media facing surface. The second surface is disposed adjacent to the media facing surface opposite to the first surface. The first trailing edge taper angle is less than the first leading edge taper angle, and the first surface of the main pole has a greater length than the second surface of the main pole.

In another embodiment, a magnetic recording head comprises a return pole, a trailing shield coupled to the return pole, and a main pole disposed adjacent to the trailing shield, the main pole extending to a media facing surface. The main pole comprises a first leading edge taper angle disposed at the media facing surface, a second leading edge taper angle disposed adjacent to the first leading edge taper angle, the second leading edge taper angle being between about 10 degrees to about 30 degrees, wherein the second leading edge taper angle is less than the first leading edge taper angle, a first trailing edge taper angle disposed at the media facing surface adjacent to the trailing shield, the first trailing edge taper angle being less than the first leading edge taper angle, and a second trailing edge taper angle disposed adjacent to the first trailing edge taper angle, the second trailing edge taper angle being between about 10 degrees to about 30 degrees, wherein the second trailing edge taper angle is less than the first trailing edge taper angle.

In another embodiment, a magnetic recording head comprises a return pole, a trailing shield coupled to the return pole, and a main pole disposed adjacent to the return pole and the trailing shield, the main pole extending to a media facing surface. The main pole comprises a first leading edge taper angle disposed between a first surface of the main pole disposed at the media facing surface and a second surface of the main pole disposed adjacent to the first surface, a second leading edge taper angle less than the first leading edge taper angle, the second leading edge taper angle disposed between the second surface and a third surface of the main pole disposed adjacent to the second surface, a first trailing edge taper angle disposed between the first surface and a fourth surface of the main pole disposed adjacent to the first surface and opposite to the second surface, the first trailing edge taper angle being less than the first leading edge taper angle, a second trailing edge taper angle less than the first trailing edge taper angle, the second trailing edge taper angle disposed between the fourth surface and a fifth surface of the main pole disposed adjacent to the fourth surface and opposite the third surface, a first flare recessed a first distance from the media facing surface, the first flare having a first flare angle, and a second flare recessed a second distance from the media facing surface, the second distance being greater than the first distance, wherein the second flare has a second flare angle greater than the first flare angle.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally related to a magnetic media drive employing a magnetic recording head. The magnetic recording head comprises a main pole extending to a media facing surface (MFS). The main pole has a gradually increasing cross-section area with a low aspect ratio from the MFS to a surface recessed from and parallel to the MFS. The main pole comprises a first leading edge taper angle (LETA), a second LETA less than the first LETA, a first trailing edge taper angle (TETA), and a second TETA less than the first TETA. The main pole further comprises a first flare recessed a first distance from the MFS, the first flare having a first angle, and a second flare recessed a second distance from the MFS greater than the first distance, the second flare having a second angle greater than the first angle.

Figure 1:
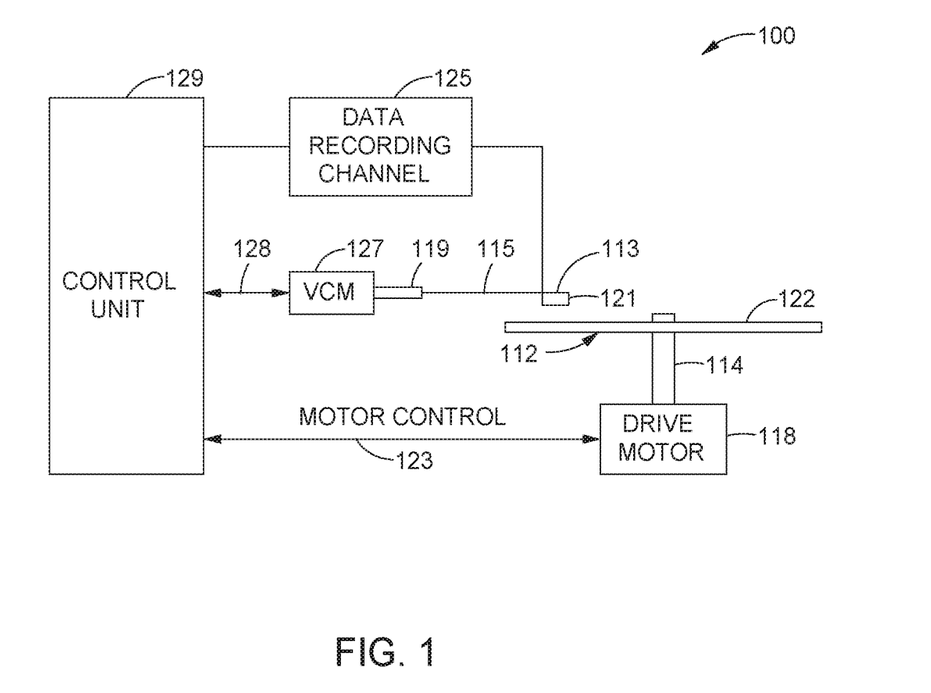
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
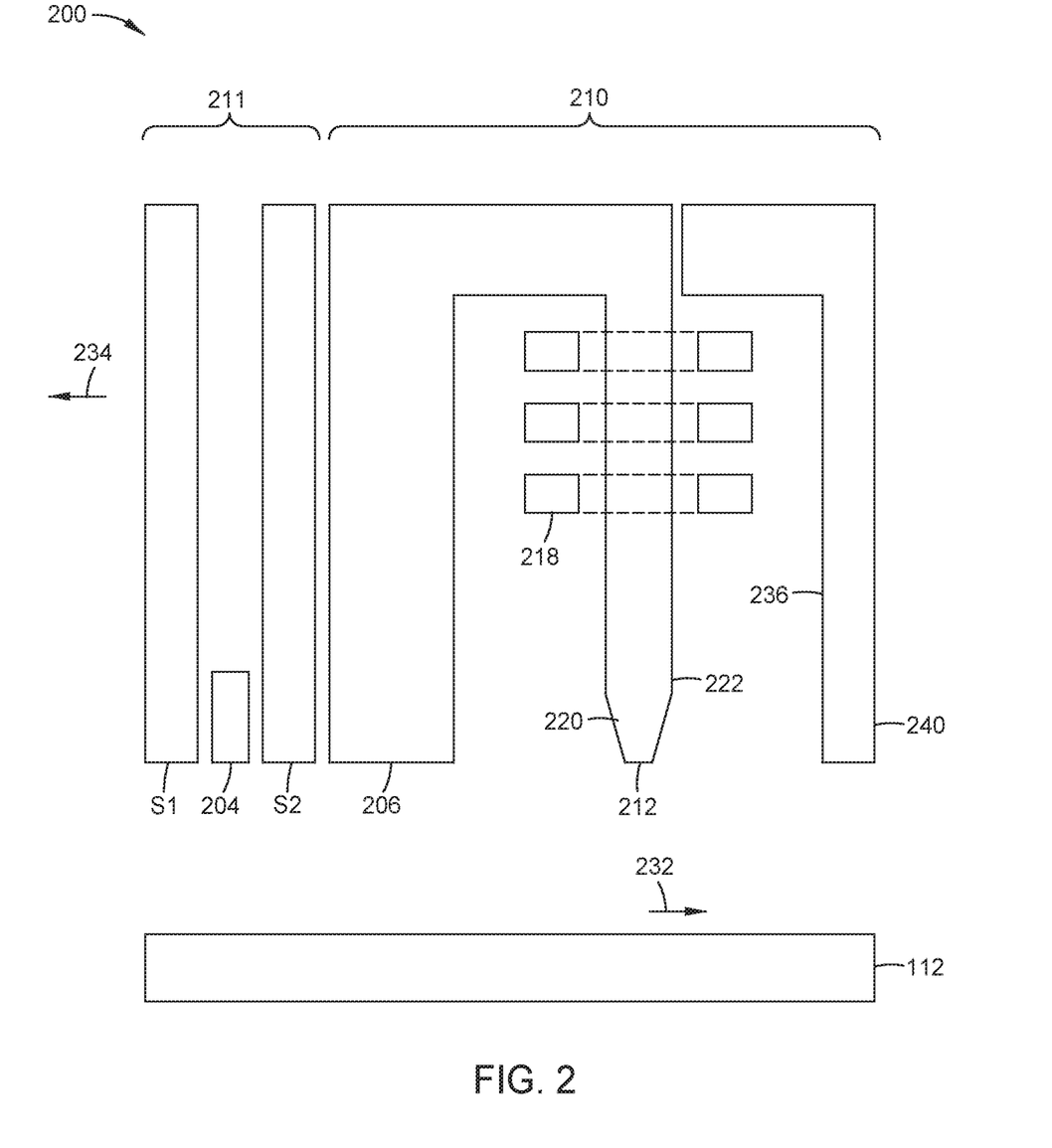
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a MFS 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 2.0 T.

Figure 3A:
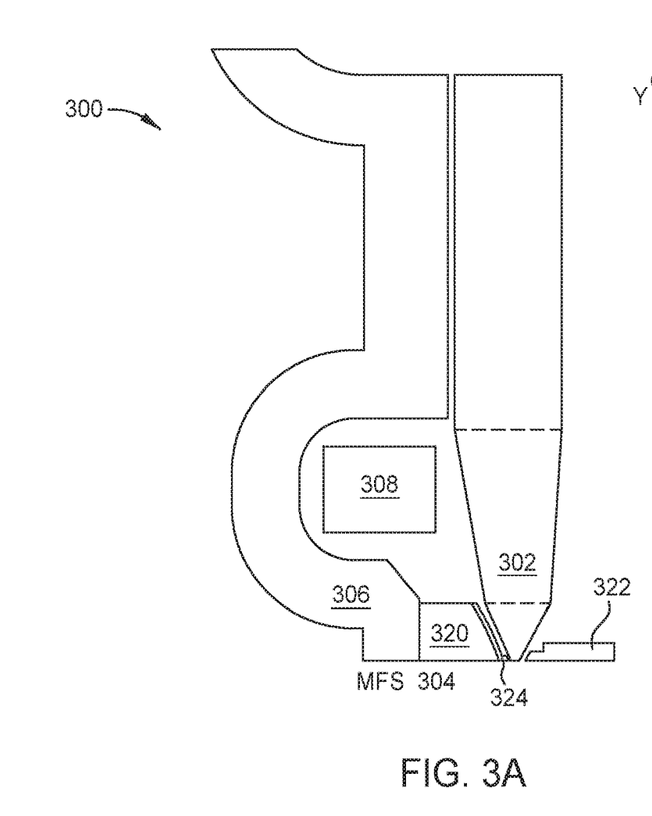
FIGS. 3A-3B illustrate various views of a magnetic recording head, according to one embodiment.
Figure 3B:
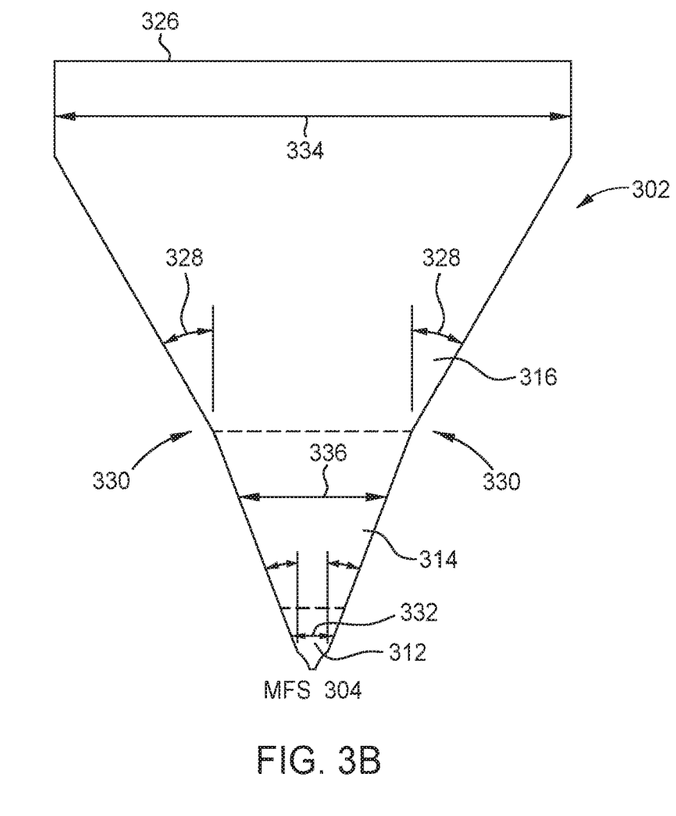

FIGS. 3A-3B illustrate various views of a magnetic recording head 300, according to one embodiment. FIG. 3A illustrates a cross-sectional view of the magnetic recording head, according to one embodiment. FIG. 3B illustrates a cross-sectional view of the main pole 302 of the magnetic recording head 300, according to one embodiment. The magnetic recording head 300 may correspond to the magnetic head assembly 121 described in FIG. 1 and/or the read/write head 200 described in FIG. 2.

The magnetic recording head 300 comprises a main pole 302 extending to the MFS 304, a return pole 306 disposed adjacent to the main pole 302, and a coil 308 disposed between the main pole 302 and the return pole 306, as shown in FIG. 3A. At the MFS 304, the main pole 302 is disposed between a leading shield 322 and a trailing shield 320. The trailing shield 320 is coupled to the return pole 306. An EAMR stack 324 is disposed between the main pole 302 and the trailing shield 320 at the MFS 304. When current, such as DC current or bias current, is applied, the current is configured to flow to the main pole 302 through the EAMR stack 324 to the return pole 306.

The main pole 302 has a gradually increasing cross-section area with a low aspect ratio, or a ratio of thickness in the y-direction to width in the x-direction of about 0.8:4.2, such as about 1.2:3.8, such as about 1:4, from the MFS 304 to a plane or a surface 326 of the main pole 302 recessed from and parallel to the MFS 304 (e.g., towards the coil 308), as shown in FIG. 3B. The main pole 302 comprises a first portion 312 disposed at the MFS 304, a second portion 314 disposed above the first portion 312, and a third portion 316 disposed above the second portion 314. Unlike conventional main pole, the second portion 314 of the main pole 302 does not comprise a backstop or back step (e.g., a sudden, non-gradual change in thickness). Moreover, as discussed further below in FIGS. 4A-4B, the angle 328 of the flare 330 relative to the MFS 304 from the second portion 314 to the first portion 312 is about 30 degrees, rather than about 45 degrees or higher like in conventional main poles.

In some embodiments, a ratio of a first thickness (not shown) of the first portion 312 in the y-direction to a first width 334 of the third portion 316 in the x-direction is between about 0.8:4.2, such as between about 1.2:3.8, such as about 1:4. A thickness of the first portion 312 can be seen below in FIG. 5A as the thickness 536 or distance between the first surface 510 of the main pole 502 and the third surface 514 of the main pole 502. In yet another embodiment, a ratio of a first thickness of the first portion 312 in the y-direction to a second width 336 of the second portion 314 in the x-direction is between about 0.8:4.2, such as between about 1.2:3.8, such as about 1:4. In such an embodiment, a ratio of a second thickness of the second portion 314 in the y-direction to the first width 334 of the third portion 316 in the x-direction is between about 0.8:4.2, such as between about 1.2:3.8, such as about 1:4.

In other embodiments, a ratio of a first thickness in the y-direction of the first portion 312 to a third width 332 in the x-direction of the first portion 312 is between about 0.8:4.2, such as between about 1.2:3.8, such as about 1:4. Similarly, in some embodiments, a ratio of a third thickness (not shown) in the y-direction of the third portion 316 to the first width 334 in the x-direction of the third portion 316 is between about 0.8:4.2, such as between about 1.2:3.8, such as about 1:4. Moreover, in some embodiments, a ratio of the second thickness (not shown) in the y-direction of the second portion 314 to the second width 336 in the x-direction of the second portion 314 is between about 0.8:4.2, such as between about 1.2:3.8, such as about 1:4. As such, the ratio of thickness to width may be defined per portion or between portions of the main pole 302.

The gradually increasing cross-section area with a low aspect ratio, such as a ratio of thickness in the y-direction to width in the x-direction of about 1:4, of the main pole 302 results in a more uniform Ampere field distribution in the main pole when current is applied from the EAMR stack 324, thus reducing the soft error rate (SER) in the written data. Moreover, the gradually increasing cross-section area with a low aspect ratio, such as a ratio of thickness to width of about 1:4, of the main pole 302 further results in about a 10% field gradient increase (Hgrad gain in Oe/nm) when a 0 mA bias is applied and when a 20 mA bias is applied, as compared to conventional main poles.

Figure 4A:
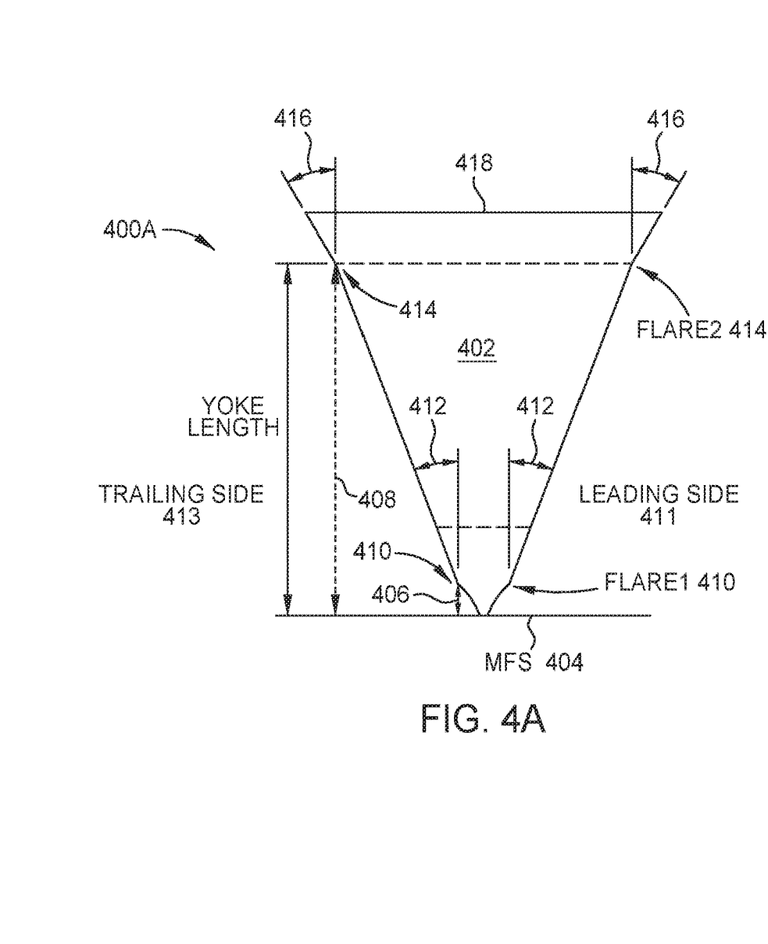
FIGS. 4A-4B illustrate various views of the main pole of a magnetic recording head, according to various embodiments.
Figure 4B:
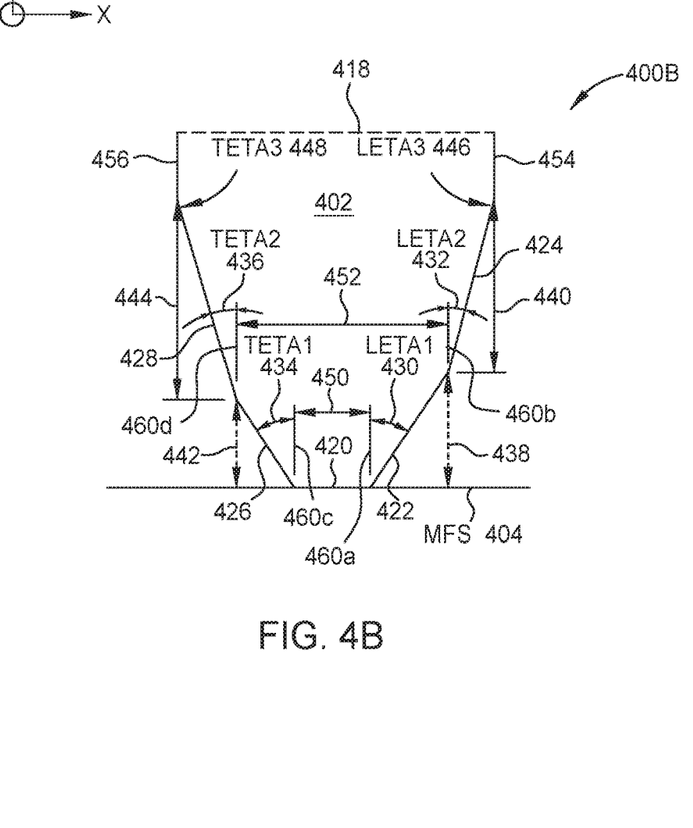

FIG. 4A illustrates a top view of the main pole 402 of a magnetic recording head 400A, and FIG. 4B illustrates a cross-section view of the main pole 402 of the magnetic recording head 400B, according to various embodiments. The magnetic recording heads 400A and 400B are the same magnetic recording head 400 (collectively referred to as magnetic recording head 400), but are shown from different perspectives. The magnetic recording head 400 may correspond to the magnetic head assembly 121 described in FIG. 1 and/or the read/write head 200 described in FIG. 2. The magnetic recording head 400 may be the magnetic recording head 300 and the main pole 302 of FIGS. 3A-3B.

FIG. 4A illustrates a first flare (flare1) 410 and a second flare (flare2) 414 of the main pole 402. The main pole 402 comprises a first flare 410 having a first angle 412 and a second flare 414 having a second angle 416. The first flare 410 is recessed from the MFS 404 a distance of about 100 nm to about 200 nm, and the second flare 414 is recessed from the MFS 404 a distance of about 500 nm to about 2000 nm. The main pole 402 may be symmetrical such that one or more surfaces of the main pole 402 comprise the first and second flares 410, 414. For example, while the first flare 410 and the second flare 414 are shown on a leading side 411 of the main pole 402, in some embodiments, the first and second flares 410, 414 may be disposed on the trailing side 413 instead or in addition to the leading side 411. The first angle 412 of the first flare 410 is smaller than the second angle 416 of the second flare 414. The first angle 412 is between about 20 degrees to about 35 degrees, and the second angle 416 is between about 30 degrees to about 45 degrees. The first flare 410 is spaced (i.e., recessed) a first distance 406 from the MFS 404, and the second flare 414 is spaced (i.e., recessed) a second distance 408 from the MFS 404. The second distance 408 is greater than the first distance 406. In one embodiment, the second distance 408 is substantially equal to the yoke length of the main pole 402 (e.g., about 2 μm in length).

FIG. 4B illustrates a first leading edge taper angle (LETA1) 430, a second leading edge taper angle (LETA2) 432, a first trailing edge taper angle (TETA1) 434, and a second trailing edge taper angle (TETA2) 436 of the main pole 402. The LETA1 430 and the LETA2 432 are disposed adjacent to a leading shield (not shown) of the magnetic recording head 400 while the TETA1 434 and the TETA2 436 are disposed adjacent to a trailing shield (not shown) of the magnetic recording head 400. The LETA1 430, LETA2 432, the TETA1 434, the TETA2 436, the first flare 410, and the second flare 414 collectively result in the main pole 402 having a gradually increasing cross-section area with a low aspect ratio, or a ratio of thickness in the y-direction to width in the x-direction of about 0.8:4.2, such as about 1.2:3.8, such as about 1:4, from the MFS 404 towards a plane or a surface 418 of the main pole 402 recessed from and parallel to the MFS 404.

As shown in FIG. 4B, the main pole 402 comprises a first surface 420 disposed at and parallel to the MFS 404, a second surface 422 disposed adjacent to the first surface 420, a third surface 424 disposed adjacent to the second surface 422, a fourth surface 426 disposed adjacent to the first surface 420 and opposite to the second surface 422, and a fifth surface 428 disposed adjacent to the fourth surface 426 and opposite to the third surface 424. The LETA1 430 is the angle the second surface 422 is disposed at with respect to a first plane 460a perpendicular to the MFS 404, where the first plane 460a is disposed between the first surface 420 and the second surface 422. The LETA2 432 is the angle the third surface 424 is disposed at with respect to a second plane 460b perpendicular to the MFS 404, where the second plane 460b is disposed between the second surface 422 and the third surface 424. The TETA1 434 is the angle the fourth surface 426 is disposed at with respect to a third plane 460c perpendicular to the MFS 404, where the third plane 460c is disposed between the first surface 420 and the fourth surface 426. The TETA2 436 is the angle the fifth surface 428 is disposed at with respect to a fourth plane 460d perpendicular to the MFS 404, where the fourth plane 460d is disposed between the fourth surface 426 and the fifth surface 428.

In one embodiment, the LETA1 430 is between about 30 degrees to about 40 degrees, the LETA2 432 is between about 10 degrees to about 30 degrees, the TETA1 434 is between about 20 degrees to about 30 degrees, and the TETA2 436 is between about 10 degrees to about 30 degrees. In another embodiment, the LETA1 430 is about 30 degrees, the LETA2 432 is about 15 degrees, the TETA1 434 is about 25 degrees, and the TETA2 436 is about 15 degrees. Thus, the TETA1 434 is smaller than the LETA1 430. The LETA2 432 and the TETA2 436 are both individually smaller than the LETA1 430 and the TETA1 434. The LETA2 432 and the TETA2 436 may be the same, or the LETA2 432 and the TETA2 436 may be different.

The LETA2 432 is recessed a first distance 438 from the MFS 404, and the TETA2 436 is recessed a second distance 442 from the MFS 404. The second distance 442 is less than the first distance 438. In one embodiment, the first distance 438 is between about 0.10 μm to about 0.50 μm, and the second distance 442 is between about 0.09 μm to about 0.49 μm. In another embodiment, the first distance 438 is about 0.14 μm and the second distance 442 is about 0.11 μm. Thus, the LETA2 432 is unaligned with the TETA2 436 in a cross-track direction (i.e., the x-direction). In other words, the TETA2 436 is disposed closer to the MFS 404 than the LETA2 432. Moreover, the first distance 438 being greater than the second distance 442 results in a first length of the second surface 422 being greater than a second length of the fourth surface 426.

The LETA1 430 is spaced a third distance 450 from the TETA1 434, and the LETA2 432 is spaced a fourth distance 452 from the TETA2 436. The fourth distance 452 is greater than the third distance 450. The third distance 450 may be substantially equal to a length of the first surface 420 of the main pole 402. The LETA2 432 is spaced a fifth distance 440 from a third leading edge taper angle (LETA3) 446, and the TETA2 436 is spaced a sixth distance 444 from a third trailing edge taper angle (TETA3) 448. The fifth distance 440 and the sixth distance 444 are each individually between about 0.5 μm to about 1.7 μm. The fifth distance 440 may be different than the sixth distance 444. For example, the sixth distance 444 may be greater than the fifth distance 440. In some embodiments, the first distance 438 being greater than the second distance 442 results in a length of the fifth surface 428 being greater than a length of the third surface 424.

The LETA3 446 is the angle the sixth surface 454 is disposed at with respect to a plane (not shown) perpendicular to the MFS 404, and the TETA3 448 is the angle the seventh surface 456 is disposed at with respect to a plane (not shown) perpendicular to the MFS 404. The first distance 438 plus the fifth distance 440 is the distance the LETA3 446 is recessed from the MFS 404. The second distance 442 plus the sixth distance 444 is the distance the TETA3 448 is recessed from the MFS 404. In one embodiment, the LETA3 446 and the TETA3 448 may each individually be recessed from the MFS 404 up to about 2 μm. The LETA3 446 and the TETA3 448 may be aligned such that the LETA3 446 and the TETA3 448 are recessed a same distance from the MFS 404 or unaligned such that the LETA3 446 and the TETA3 448 are recessed different distances from the MFS 404. In one embodiment, a sixth surface 454 of the main pole 402 disposed adjacent to the third surface 424 is substantially perpendicular to the MFS 404 and the first surface 420. In such an embodiment, a seventh surface 456 of the main pole 402 disposed adjacent to the fifth surface 428 and opposite the sixth surface 454 is substantially perpendicular to the MFS 404 and the first surface 420.

Figure 5A:
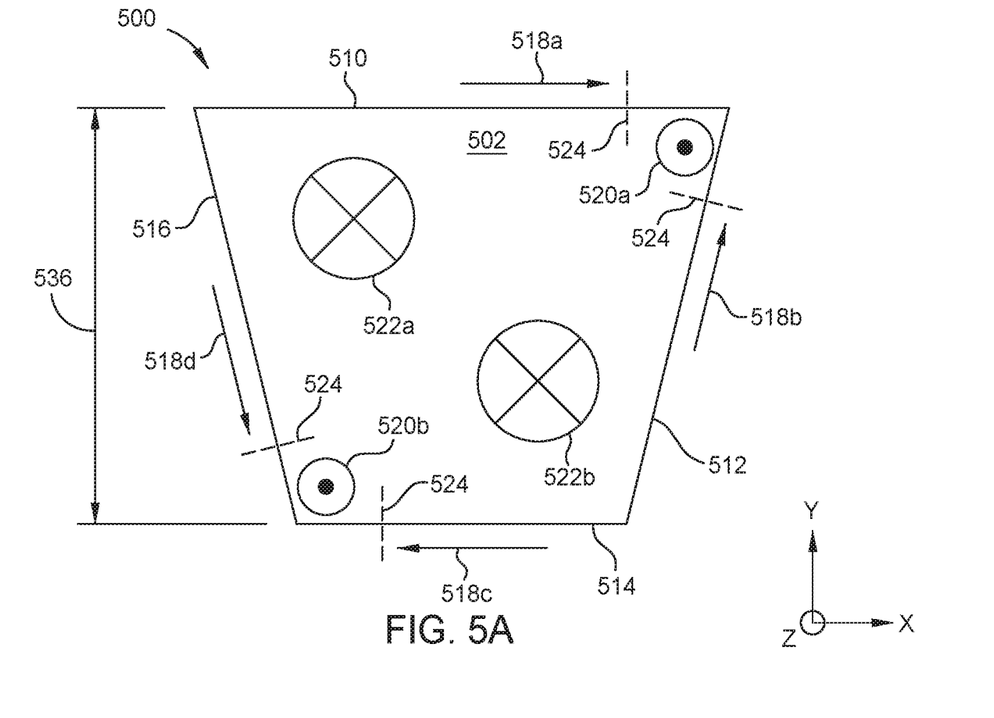
FIG. 5A illustrates an MFS view of the main pole of a magnetic recording head, according to another embodiment.
Figure 5B:
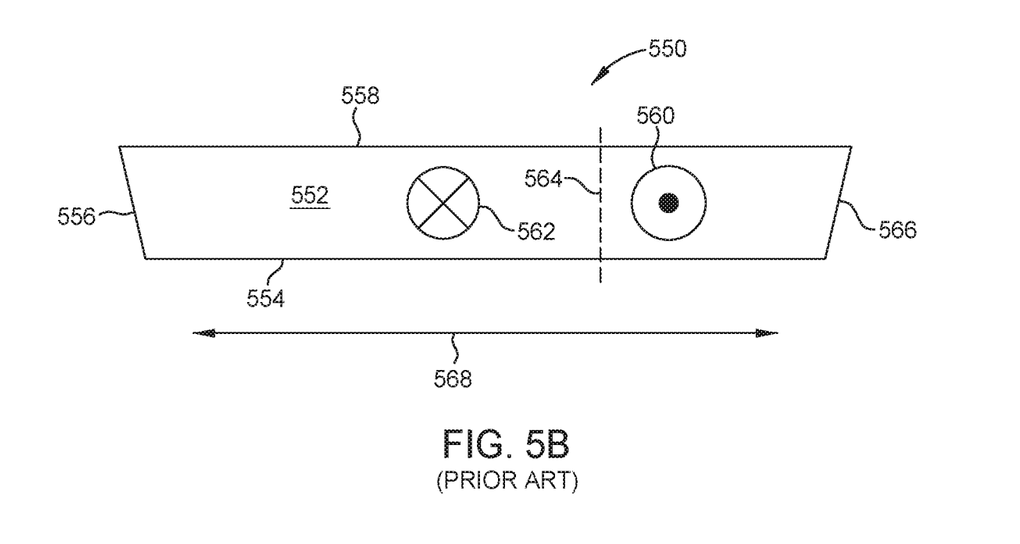
FIG. 5B illustrates an MFS view of a conventional main pole of a conventional magnetic recording head for comparison purposes.

FIG. 5A illustrates an MFS view of the main pole 502 of a magnetic recording head 500, according to one embodiment. The magnetic recording head 500 may correspond to the magnetic head assembly 121 described in FIG. 1 and/or the read/write head 200 described in FIG. 2. The magnetic recording head 500 may be the magnetic recording head 300 and the main pole 302 of FIGS. 3A-3B and/or the magnetic recording head 400 and the main pole 402 of FIGS. 4A-4B. FIG. 5B illustrates an MFS view of a conventional main pole 552 of a conventional magnetic recording head 550 for comparison purposes.

As discussed above, the thickness 536 of the first portion (i.e., the first portion 312 of FIG. 3B) of the main pole 502 is the distance between the first surface 510 of the main pole 502 and the third surface 514 of the main pole 502. The thickness of a second portion (i.e., the second portion 314 of FIG. 3B) and the thickness of a third portion (i.e., the third portion 316 of FIG. 3B) are not shown for clarity. However, in some embodiments, the thicknesses of the second and third portions are proportionally the same as the thickness 536 of the first portion.

The MFS view of the main pole 502 comprises a first surface 510, a second surface 512 disposed adjacent to the first surface 510, a third surface 514 disposed adjacent to the second surface 512 and opposite the first surface 510, and a fourth surface 516 disposed adjacent to the third surface 514 and opposite to the second surface 512. The first surface 510 is disposed adjacent to a trailing shield and EAMR stack, the second and fourth surfaces 512, 516 are disposed adjacent to one or more side shields, and the third surface is disposed adjacent to a leading shield. The second and fourth surfaces 512, 516 have substantially the same length. The MFS view of the main pole 502 has a trapezoidal shape that is more square than rectangular. For example, the second and fourth surfaces 512, 516 disposed adjacent to one or more side shields have a length not much shorter (e.g., a ratio of a length of surfaces 512, 516 to a length of surface 514 greater than about ⅓) than at least the third surface 514. The main pole 502 having a more square-like shape enables the Ampere field from an EAMR stack to be more uniform.

As a comparison, the conventional main pole 552 of FIG. 5B is more rectangular in shape, having second and third surfaces 566, 556, respectfully, adjacent to one or more side shields with a smaller length than the first surface 554 disposed adjacent to a leading shield and/or the fourth surface 558 disposed adjacent to a trailing shield. The conventional main pole 552 of FIG. 5B further has a longer time for domain motion 568 when write current is applied. For example, when bias current is applied to the conventional main pole 552, a domain wall 564 is disposed between the flux 562 going up or into the conventional main pole 552 in the −z-direction and the flux 560 going down or out of the conventional main pole 552 in the z-direction. The domain motion 568 of the conventional main pole 552 is towards both the second surface 566 and the third surface 556.

Conversely, the main pole 502 of FIG. 5A has less domain motion 518a, 518b, 518c, 518d (collectively referred to as domain motion 518) and a greater amount of flux 520a, 520b, 522a, 522b (collectively referred to as flux 520 and flux 522, respectively) when a given bias current is applied. Additionally, the flux 520, 522 is more evenly distributed than in the conventional main pole 552 of the conventional magnetic recording head 550. For example, the flux 522 (shown as 522a and 522b) going up or into the main pole 502 in the −z-direction is more centrally disposed on the media facing surface of the main pole 502 than the flux 520 (shown as 520a and 520b) going down or out of the main pole 502 in the z-direction. Additionally, the flux 522 going up or into the main pole 502 in the −z-direction is stronger (shown as larger circles) than the flux 520 going down or out of the main pole 502 in the z-direction.

As shown in FIG. 5A, the flux 522a going up or into the main pole 502 in the −z-direction is disposed between the first surface 510 and the fourth surface 516, and the flux 522b going up or into the main pole 502 in the −z-direction is disposed between the second surface 512 and the third surface 514 such that the flux 522 is equally distributed in opposite corners of the main pole 502. Similarly, the flux 520a going down or out of the main pole 502 in the z-direction is disposed between the first surface 510 and the second surface 512, and the flux 520b going down or out of the main pole 502 in the z-direction is disposed between the third surface 514 and the fourth surface 516 such that the flux 520 is equally distributed in opposite corners of the main pole 502 from the flux 522.

The domain motion 518 of the main pole 502 is towards the downwards flux 520 (i.e., the flux 520 going down or out of the main pole 502 in the z-direction). In other words, a domain motion 518a along the first surface 510 points towards the downwards flux 520a in the x-direction, a domain motion 518b along the second surface 512 points towards the downwards flux 520a offset from the y-direction towards the x-direction (i.e., the xy-direction), a domain motion 518c along the third surface 514 points towards the downwards flux 520b in the −x-direction, and a domain motion 518d along the fourth surface 516 points towards the downwards flux 520b offset from the −y-direction towards the x-direction (i.e., the x-y-direction). Domain walls 524 may be disposed near the downwards flux 520 from the domain motion 518. However, the domain walls 524 of the main pole 502 do not fully extend through the main pole 502 to completely separate the downwards flux 520 from the upwards flux 522, unlike the domain wall 564 of the conventional main pole 552.

Thus, a main pole having a gradually increasing cross-section area with a low aspect ratio, or a ratio of thickness to width of about 1:4, results in a more uniform Ampere field distribution in the main pole when bias current is applied from the EAMR stack, reducing the soft error rate (SER) in the written data. Moreover, the overall shape and area of the main pole results in a greater amount of flux for a given current while reducing domain motion within the main pole. Additionally, the gradually increasing cross-section area with a low aspect ratio of the main pole further results in about a 10% field gradient increase (Hgrad gain in Oe/nm) when a 0 mA bias is applied and when a 20 mA bias is applied, as compared to conventional main poles. As such, the overall performance of the magnetic recording head comprising a main pole having a gradually increasing cross-section area with a low aspect ratio is improved.

It is to be understood that the magnetic recording head discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," application. Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

In one embodiment, a magnetic recording head comprises a return pole, a main pole disposed adjacent to the return pole, the main pole extending to a media facing surface, and a coil disposed around a portion of the main pole, the coil being recessed from the media facing surface. The main pole has a first leading edge taper angle. The first leading edge taper angle is an angle a first surface of the main pole is disposed at with respect to a first plane perpendicular to the media facing surface. The first surface is disposed adjacent to the media facing surface. The main pole has a first trailing edge taper angle. The first trailing edge taper angle is an angle a second surface of the main pole is disposed at with respect to a second plane perpendicular to the media facing surface. The second surface is disposed adjacent to the media facing surface opposite to the first surface. The first trailing edge taper angle is less than the first leading edge taper angle, and the first surface of the main pole has a greater length than the second surface of the main pole.

The main pole has a gradually increasing cross-section area with a low aspect ratio from the media facing surface to a third plane recessed from and parallel to the media facing surface towards the coil such that a ratio of a thickness of the main pole to a width of the main pole is about 1:4. The first leading edge taper angle is between about 30 degrees to about 40 degrees, and the first trailing edge taper angle is between about 25 degrees to about 30 degrees. The main pole has a second leading edge taper angle of about 10 degrees to about 30 degrees. The main pole has a second trailing edge taper angle of about 10 degrees to about 30 degrees. The second leading edge taper angle is between a second surface of the main pole disposed adjacent to a first surface of the main pole disposed at the media facing surface and a third surface of the main pole disposed adjacent to the second surface.

The second leading edge taper angle an angle a third surface of the main pole is disposed at with respect to a fourth plane perpendicular to the media facing surface, the third surface being disposed adjacent to the first surface. The second leading edge taper angle is recessed from the media facing surface a first distance. The second trailing edge taper angle is an angle a fourth surface of the main pole is disposed at with respect to a fifth plane perpendicular to the media facing surface, the fourth surface being disposed adjacent to the second surface. The second trailing edge taper angle is recessed a second distance from the media facing surface less than the first distance of the second leading edge taper angle. The first distance is between about 0.10 µm to about 0.50 µm, and wherein the second distance is between about 0.09 µm to about 0.49 µm. The main pole further comprises a first flare having a first flare angle, and a second flare having a second flare angle greater than the first angle. The first flare angle is between about 20 degrees to about 35 degrees, and the second flare angle is between about 30 degrees to about 45 degrees.

In another embodiment, a magnetic recording head comprises a return pole, a trailing shield coupled to the return pole, and a main pole disposed adjacent to the trailing shield, the main pole extending to a media facing surface. The main pole comprises a first leading edge taper angle disposed at the media facing surface, a second leading edge taper angle disposed adjacent to the first leading edge taper angle, the second leading edge taper angle being between about 10 degrees to about 30 degrees, wherein the second leading edge taper angle is less than the first leading edge taper angle, a first trailing edge taper angle disposed at the media facing surface adjacent to the trailing shield, the first trailing edge taper angle being less than the first leading edge taper angle, and a second trailing edge taper angle disposed adjacent to the first trailing edge taper angle, the second trailing edge taper angle being between about 10 degrees to about 30 degrees, wherein the second trailing edge taper angle is less than the first trailing edge taper angle.

The second leading edge taper angle is recessed a first distance from the media facing surface, and wherein the second trailing edge taper angle is recessed a second distance from the media facing surface, the second distance being less than the first distance. The first distance is about 0.14 µm, and wherein the second distance is about 0.11 µm. The first leading edge taper angle is between about 30 degrees to about 40 degrees and the first trailing edge taper angle is between about 25 degrees to about 30 degrees. The main pole further comprises: a third leading edge taper angle disposed adjacent to the second leading edge taper angle, the third leading edge taper angle being recessed a third distance from the media facing surface, and a third trailing edge taper angle disposed adjacent to the second trailing edge taper angle, the third trailing edge taper angle being recessed a fourth distance from the media facing surface, wherein the third distance is substantially equal to the fourth distance.

The main pole has a gradually increasing cross-section area with a low aspect ratio from the media facing surface to a plane recessed from and parallel to the media facing surface such that a ratio of a thickness of the main pole to a width of the main pole is about 1:4. The main pole further comprises a first flare recessed a fifth distance from the media facing surface and a second flare recessed a sixth distance from the media facing surface, the sixth distance being greater than the fifth distance. The first flare has an angle of about 20 degrees to about 35 degrees, and the second flare has an angle of about 30 degrees for about 45 degrees.

In another embodiment, a magnetic recording head comprises a return pole, a trailing shield coupled to the return pole, and a main pole disposed adjacent to the return pole and the trailing shield, the main pole extending to a media facing surface. The main pole comprises a first leading edge taper angle disposed between a first surface of the main pole disposed at the media facing surface and a second surface of the main pole disposed adjacent to the first surface, a second leading edge taper angle less than the first leading edge taper angle, the second leading edge taper angle disposed between the second surface and a third surface of the main pole disposed adjacent to the second surface, a first trailing edge taper angle disposed between the first surface and a fourth surface of the main pole disposed adjacent to the first surface and opposite to the second surface, the first trailing edge taper angle being less than the first leading edge taper angle, a second trailing edge taper angle less than the first trailing edge taper angle, the second trailing edge taper angle disposed between the fourth surface and a fifth surface of the main pole disposed adjacent to the fourth surface and opposite the third surface, a first flare recessed a first distance from the media facing surface, the first flare having a first flare angle, and a second flare recessed a second distance from the media facing surface, the second distance being greater than the first distance, wherein the second flare has a second flare angle greater than the first flare angle.

The first leading edge taper angle is an angle the second surface is disposed at with respect to a first plane perpendicular to the media facing surface, the first leading edge taper angle being about 40 degrees. The second leading edge taper angle is an angle the third surface is disposed at with respect to a second plane perpendicular to the media facing surface, the second leading edge taper angle being about 15 degrees. The first trailing edge taper angle is an angle the fourth surface is disposed at with respect to a third plane perpendicular to the media facing surface, the first trailing edge taper angle being about 30 degrees. The second trailing edge taper angle is an angle the fifth surface is disposed at with respect to a fourth plane perpendicular to the media facing surface, the second trailing edge taper angle being about 15 degrees. The first flare angle is between about 20 degrees to about 35 degrees, and the second flare angle is between about 30 degrees for about 45 degrees. The second leading edge taper angle and the second trailing edge taper angle are unaligned in a cross-track direction. The magnetic recording head further comprises a coil disposed around a portion of the main pole, the coil being recessed from the media facing surface, wherein the main pole has a gradually increasing cross-section area with a low aspect ratio from the media facing surface to a fifth plane recessed from and parallel to the media facing surface towards the coil such that a ratio of a thickness of the main pole to a width of the main pole is about 1:4.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a return pole;
a main pole disposed adjacent to the return pole, the main pole extending to a media facing surface; and
a coil disposed around a portion of the main pole, the coil being recessed from the media facing surface,
wherein the main pole has a first leading edge taper angle, the first leading edge taper angle being an angle a first surface of the main pole is disposed at with respect to a first plane perpendicular to the media facing surface, the first surface being disposed adjacent to the media facing surface,
wherein the main pole has a first trailing edge taper angle, the first trailing edge taper angle being an angle a second surface of the main pole is disposed at with respect to a second plane perpendicular to the media facing surface, the second surface being disposed adjacent to the media facing surface opposite to the first surface,
wherein the first trailing edge taper angle is less than the first leading edge taper angle,
wherein the first surface of the main pole has a greater length than the second surface of the main pole, and
wherein the main pole has a gradually increasing cross-sectional area from the media facing surface to a third plane recessed from and parallel to the media facing surface towards the coil such that a ratio of a thickness of the main pole to a width of the main pole is about 1:4.

2. The magnetic recording head of claim 1, wherein the first leading edge taper angle is between about 30 degrees to about 40 degrees, the first trailing edge taper angle is between about 25 degrees to about 30 degrees, and wherein the main pole has a second leading edge taper angle between about 10 degrees to about 30 degrees and a second trailing edge taper angle between about 10 degrees to about 30 degrees.

3. The magnetic recording head of claim 2, wherein the second leading edge taper angle is an angle a third surface of the main pole is disposed at with respect to a fourth plane perpendicular to the media facing surface, the third surface being disposed adjacent to the first surface;
wherein the second leading edge taper angle is recessed from the media facing surface a first distance;
wherein the second trailing edge taper angle is an angle a fourth surface of the main pole is disposed at with respect to a fifth plane perpendicular to the media facing surface, the fourth surface being disposed adjacent to the second surface; and
wherein the second trailing edge taper angle is recessed a second distance from the media facing surface less than the first distance of the second leading edge taper angle.

4. The magnetic recording head of claim 3, wherein the first distance is between about 0.10 µm to about 0.50 µm, and wherein the second distance is between about 0.09 µm to about 0.49 µm.

5. The magnetic recording head of claim 1, wherein the main pole further comprises a first flare having a first flare angle, and a second flare having a second flare angle greater than the first angle.

6. The magnetic recording head of claim 5, wherein the first flare angle is between about 20 degrees to about 35 degrees, and wherein the second flare angle is between about 30 degrees to about 45 degrees.

7. A data storage device comprising the magnetic recording head of claim 1.

8. The magnetic recording head of claim 1, wherein the first surface of the main pole is coupled to a third surface of the main pole, the first and third surfaces forming a second leading edge taper angle, and wherein the second surface of the main pole is coupled to a fourth surface of the main pole, the second and fourth surfaces forming a second trailing edge taper angle.

9. A magnetic recording head, comprising:
a return pole;
a trailing shield coupled to the return pole; and
a main pole disposed adjacent to the trailing shield, the main pole extending to a media facing surface, wherein the main pole comprises:
a first leading edge taper angle disposed at the media facing surface;
a second leading edge taper angle disposed adjacent to the first leading edge taper angle, the second leading edge taper angle being between about 10 degrees to about 30 degrees, wherein the second leading edge taper angle is less than the first leading edge taper angle;
a first surface extending from the first leading edge taper angle to the second leading edge taper angle;
a first trailing edge taper angle disposed at the media facing surface adjacent to the trailing shield, the first trailing edge taper angle being less than the first leading edge taper angle;
a second trailing edge taper angle disposed adjacent to the first trailing edge taper angle, the second trailing edge taper angle being between about 10 degrees to about 30 degrees, wherein the second trailing edge taper angle is less than the first trailing edge taper angle; and
a second surface extending from the first trailing edge taper angle to the second trailing edge taper angle.

10. The magnetic recording head of claim 9, wherein the main pole has a gradually increasing cross-section area with a low aspect ratio from the media facing surface to a plane recessed from and parallel to the media facing surface such that a ratio of a thickness of the main pole to a width of the main pole is about 1:4.

11. The magnetic recording head of claim 9, wherein the main pole further comprises a first flare recessed a fifth distance from the media facing surface and a second flare recessed a sixth distance from the media facing surface, the sixth distance being greater than the fifth distance.

12. The magnetic recording head of claim 11, wherein the first flare has an angle of about 20 degrees to about 35 degrees, and wherein the second flare has an angle of about 30 degrees for about 45 degrees.

13. A data storage device comprising the magnetic recording head of claim 9.

14. A magnetic recording head, comprising:
a return pole;
a trailing shield coupled to the return pole; and
a main pole disposed adjacent to the trailing shield, the main pole extending to a media facing surface, wherein the main pole comprises:
  a first leading edge taper angle disposed at the media facing surface;
  a second leading edge taper angle disposed adjacent to the first leading edge taper angle, the second leading edge taper angle being between about 10 degrees to about 30 degrees, wherein the second leading edge taper angle is less than the first leading edge taper angle;
  a first trailing edge taper angle disposed at the media facing surface adjacent to the trailing shield, the first trailing edge taper angle being less than the first leading edge taper angle; and
  a second trailing edge taper angle disposed adjacent to the first trailing edge taper angle, the second trailing edge taper angle being between about 10 degrees to about 30 degrees, wherein the second trailing edge taper angle is less than the first trailing edge taper angle,
  wherein the first leading edge taper angle is between about 30 degrees to about 40 degrees and the first trailing edge taper angle is between about 25 degrees to about 30 degrees;
  wherein the second leading edge taper angle is recessed a first distance from the media facing surface; and
  wherein the second trailing edge taper angle is recessed a second distance from the media facing surface, the second distance being less than the first distance.

15. The magnetic recording head of claim 14, wherein the first distance is about 0.14 μm and the second distance is about 0.11 μm.

16. The magnetic recording head of claim 14, wherein the main pole further comprises:
  a third leading edge taper angle disposed adjacent to the second leading edge taper angle, the third leading edge taper angle being recessed a third distance from the media facing surface; and
  a third trailing edge taper angle disposed adjacent to the second trailing edge taper angle, the third trailing edge taper angle being recessed a fourth distance from the media facing surface, wherein the third distance is substantially equal to the fourth distance.

17. A magnetic recording head, comprising:
a return pole;
a trailing shield coupled to the return pole; and
a main pole disposed adjacent to the return pole and the trailing shield, the main pole extending to a media facing surface, wherein the main pole comprises:
  a first leading edge taper angle disposed between a first surface of the main pole disposed at the media facing surface and a second surface of the main pole disposed adjacent to the first surface;
  a second leading edge taper angle less than the first leading edge taper angle, the second leading edge taper angle disposed between the second surface and a third surface of the main pole disposed adjacent to the second surface;
  a first trailing edge taper angle disposed between the first surface and a fourth surface of the main pole disposed adjacent to the first surface and opposite to the second surface, the first trailing edge taper angle being less than the first leading edge taper angle;
  a second trailing edge taper angle less than the first trailing edge taper angle, the second trailing edge taper angle disposed between the fourth surface and a fifth surface of the main pole disposed adjacent to the fourth surface and opposite the third surface;
  a first flare recessed a first distance from the media facing surface, the first flare having a first flare angle; and
  a second flare recessed a second distance from the media facing surface, the second distance being greater than the first distance, wherein the second flare has a second flare angle greater than the first flare angle.

18. The magnetic recording head of claim 17, wherein the first leading edge taper angle is an angle the second surface is disposed at with respect to a first plane perpendicular to the media facing surface, the first leading edge taper angle being about 40 degrees, and wherein the second leading edge taper angle is an angle the third surface is disposed at with respect to a second plane perpendicular to the media facing surface, the second leading edge taper angle being about 15 degrees.

19. The magnetic recording head of claim 17, wherein the first trailing edge taper angle is an angle the fourth surface is disposed at with respect to a third plane perpendicular to the media facing surface, the first trailing edge taper angle being about 30 degrees, and wherein the second trailing edge taper angle is an angle the fifth surface is disposed at with respect to a fourth plane perpendicular to the media facing surface, the second trailing edge taper angle being about 15 degrees.

20. The magnetic recording head of claim 17, wherein the first flare angle is between about 20 degrees to about 35 degrees, and wherein the second flare angle is between about 30 degrees for about 45 degrees.

21. The magnetic recording head of claim 17, wherein the second leading edge taper angle and the second trailing edge taper angle are unaligned in a cross-track direction.

22. The magnetic recording head of claim 17, further comprising a coil disposed around a portion of the main pole, the coil being recessed from the media facing surface, wherein the main pole has a gradually increasing cross-section area with a low aspect ratio from the media facing surface to a fifth plane recessed from and parallel to the media facing surface towards the coil such that a ratio of a thickness of the main pole to a width of the main pole is about 1:4.

23. A data storage device comprising the magnetic recording head of claim 17.

* * * * *